United States Patent [19]

Folsom et al.

[11] Patent Number: 5,676,979
[45] Date of Patent: Oct. 14, 1997

[54] SYSTEM FOR REPAIRING RESIN-IMPREGNATED ARTICLES

[75] Inventors: Michael Folsom; Paul DiMora, both of Enfield, Conn.

[73] Assignee: United Technologies Corporation, Hartford, Conn.

[21] Appl. No.: 720,707

[22] Filed: Oct. 2, 1996

Related U.S. Application Data

[62] Division of Ser. No. 305,016, Sep. 13, 1994, Pat. No. 5,595,692.

[51] Int. Cl.⁶ .................................................. B32B 35/00
[52] U.S. Cl. ........................... 425/13; 264/36; 425/116; 425/129.1
[58] Field of Search ....................... 425/13, 11, 116, 425/127, 129.1, 145, 149; 264/36, 40.7, 259, 264, 328.7

[56] References Cited

U.S. PATENT DOCUMENTS

| | | | |
|---|---|---|---|
| 3,194,868 | 7/1965 | Shaw | 264/328 |
| 3,814,645 | 6/1974 | Fletcher | 156/94 |
| 4,060,953 | 12/1977 | Milne | 52/743 |
| 4,141,127 | 2/1979 | Cretella et al. | 29/156.8 |
| 4,235,952 | 11/1980 | Holmes et al. | 428/60 |
| 4,290,744 | 9/1981 | Dannels et al. | 425/543 |
| 4,372,740 | 2/1983 | Kuramochi et al. | 425/544 |
| 4,409,270 | 10/1983 | Faber et al. | 428/63 |
| 4,416,602 | 11/1983 | Neumeister | 425/130 |
| 4,528,150 | 7/1985 | Charlebois et al. | 264/36 |
| 4,554,036 | 11/1985 | Newson | 156/94 |
| 4,629,597 | 12/1986 | Charlebois et al. | |
| 4,632,279 | 12/1986 | Donldson et al. | 222/146.5 |
| 4,780,162 | 10/1988 | Forler et al. | 156/94 |
| 4,832,252 | 5/1989 | Fraser | 228/119 |
| 4,867,938 | 9/1989 | Schad et al. | 264/297.2 |
| 5,026,265 | 6/1991 | Kanai et al. | 425/127 |
| 5,059,370 | 10/1991 | Kojima | 264/102 |
| 5,071,054 | 12/1991 | Dzugan et al. | 228/119 |
| 5,176,859 | 1/1993 | Leffew | 264/40.5 |
| 5,204,042 | 4/1993 | James et al. | 264/257 |
| 5,209,935 | 5/1993 | Jacino et al. | 425/13 |
| 5,219,512 | 6/1993 | Tsutsumi | 264/328.8 |
| 5,221,509 | 6/1993 | Fujimoto et al. | 264/328.7 |
| 5,246,642 | 9/1993 | Slaughter et al. | 264/36 |
| 5,277,730 | 1/1994 | Darsey et al. | 156/158 |
| 5,435,866 | 7/1995 | Puppin | 156/94 |

FOREIGN PATENT DOCUMENTS

4019744 A1  1/1992  Germany .

OTHER PUBLICATIONS

Kunstostoffe, vol. 75, No. 2, Feb. 1985 Müchen, DE, pp. 73–75, Dipl.–Ing. (FH) H. Tengler 'Erkenntnisse Bei Der Weiterentwicklung Des Vakuum–Injektionsverfahrens Zur Herstellung Hochleistungsfähiger Bauteile Aus Cfk'.

*Primary Examiner*—Jay H. Woo
*Assistant Examiner*—Joseph Leyson
*Attorney, Agent, or Firm*—McCormick, Paulding & Huber

[57] ABSTRACT

In a system for repairing a resin-impregnated article having one or more dry spots or resin-depleted areas. A mold release is used to coat all surfaces of the defective article, except for the resin-depleted areas and a border area surrounding and contiguous to each resin-depleted area. The coated article is then placed within a mold cavity defined by a two-piece mold and corresponding in shape and size to the article. A plurality of shims are interposed in the parting line between the two halves of the mold, creating a first gap within the parting line and a second gap between the surfaces of the article and the walls defining the mold cavity. A gasket is also seated between the two halves of the mold to seal the mold cavity, and a vacuum pump is coupled to the mold cavity to evacuate the cavity to a negative pressure. Heated, substantially degassed resin is then injected into the mold cavity, which flows through the second gap over the coated surfaces of the article and into the resin-depleted areas to impregnate the depleted areas. The shims are then removed and the two halves of the mold are brought into engagement to substantially close the first and second gaps and squeeze excess resin from the mold cavity. The article is then heat treated within the mold cavity to cure the impregnated resin.

10 Claims, 2 Drawing Sheets

SYSTEM FOR REPAIRING RESIN-IMPREGNATED ARTICLES

This is a divisional of U.S. patent application Ser. No. 08/305,016, filed Sep. 13, 1994, now U.S. Pat. No. 5,595,692.

FIELD OF THE INVENTION

The present invention relates to methods and apparatus for resin transfer molding, and more particularly, to methods and systems for repairing defects in articles produced by resin transfer molding.

BACKGROUND OF THE INVENTION

One type of defect typically encountered in the manufacture of resin-impregnated articles produced by resin transfer molding, such as fan blades, propeller blades and other types of aircraft components, is the occurrence of resin-depleted areas or "dry spots". In a typical resin transfer molding process, a liquid resin is injected into an evacuated mold cavity containing a structural preform of the article. The structural preform is typically made of fibers, such as fiberglass, carbon, graphite and KEVLAR™, braided or woven into sheet form, with the sheets being laid on top of one another forming a laminated preform. The fiber preform absorbs the liquid resin as it is injected under pressure into the evacuated cavity, and once the preform is saturated and impregnated with resin, it is thermally cured to form the article. If the resin is not fully absorbed, or otherwise fails to fully infiltrate the preform, one or more dry spots may result in the "resin starved" areas, rendering the article defective. These dry spots can be caused, for example, by an insufficient vacuum within the mold cavity, excessive moisture in the mold cavity, excessive fiber content in the preform, or a blockage or other interruption in a resin line leading to the mold cavity. Dry spots or like voids are particularly unacceptable in aircraft components, such as propeller or fan blades, because they can significantly degrade the structural integrity of the component.

According to one known method for repairing dry spots, the resin-depleted area of the preform is first removed using, for example, a knife or similar tool. Then, the lamination immediately surrounding the dry spot is scarfed forming a recess or cavity in the surface of the article slightly larger than was the dry spot. Typically, an area of about ¼ inch wide surrounding the dry spot is scarfed for each lamination forming a part of the respective dry spot. A thin coating of resin is then brushed over the entire scarfed surface and is cured to seal the recess. Patch plies are also cut from the same type of sheet material used to make the preform, and the orientation of the fibers is selected to match that of the material removed. The resin-sealed surface of the scarfed recess is then lightly abraded and cleaned, and the patch plies are wet with resin and placed in proper position over the sealed surface. A vacuum bag is then placed over the patch plies and is evacuated in order to draw excess resin from the patch. Once the resin is cured, the vacuum bag is removed, and the patch is abraded or sanded in order to blend the patched surfaces with the surrounding contour of the article.

One drawback of this method of repair is that it is extremely time consuming, and requires skilled and intensive labor, and thus is relatively expensive. Also, the patched area is typically considerably weaker, at times on the order of 15% weaker, than the base lamination.

It is an object of the present invention to overcome the drawbacks and disadvantages of prior art methods and systems for repairing defective articles produced by resin transfer molding.

SUMMARY OF THE INVENTION

The present invention is directed to a method and system for repairing a defective article produced by resin transfer molding having at least one resin-depleted area or dry spot. An anti-adherent coating, such as a mold release, is applied to the exterior surfaces of the defective article, excluding the resin-depleted areas and preferably a border area surrounding and contiguous to each resin-depleted area. The coated article is placed in the mold cavity of a multi-section mold, which corresponds in shape and size to the article. A gap is created between an exterior surface of the defective article and a wall defining the mold cavity, preferably by interposing a plurality of spacers or shims within the parting line between sections of the mold. Liquid resin is then injected into the mold cavity and gap between the article and cavity walls, which flows over the coated surfaces and into the resin-depleted areas of the article to impregnate the depleted areas. After resin injection is complete, the gap between the article and the cavity walls is substantially closed by removing the spacers or shims and moving the sections of the mold toward each other and squeezing excess resin from the mold. If necessary, the article is heat treated within the mold to cure the impregnated resin prior to removal from the mold.

According to one aspect of the present invention, the flow rate of the resin is monitored while it is injected into the mold, and the resin pressure is periodically increased in response to the resin flow rate falling below a first minimum value. Preferably, the resin pressure is also monitored, and the resin injection is terminated when both the resin flow rate falls below a second minimum value less than the first minimum value, and the resin pressure reaches a maximum pressure value.

According to another aspect of the present invention, the resin is substantially degassed prior to injection into the mold to remove entrained air or other gases in the resin. Preferably, the resin is injected into the mold cavity by driving a piston within a resin pot, which discharges the resin from the pot into the mold. The resin is degassed by, for example, closing the resin pot with a sealed lid having a vacuum fitting, connecting the fitting to a vacuum pump, and pumping the gas from the resin pot prior to installing the piston within the pot. During resin injection, the resin flow rate is preferably monitored by measuring and recording the rate of piston travel, and increasing the pressure applied to the piston when the piston travel rate falls below a first minimum value. When the piston travel rate falls below a second minimum value less than the first minimum value, and the resin pressure reaches a maximum pressure value, the resin injection is terminated.

One advantage of the present invention is that defective resin-impregnated articles can be repaired without the relatively high level of skill and human interaction required by prior art methods and systems. Moreover, because the resin-depleted areas are impregnated by injection techniques in much the same manner as the surrounding areas of the article were originally formed, the structural integrity of the article is enhanced in comparison to articles repaired by prior art techniques.

Other advantages of the method and system of the present invention will become apparent in view of the following detailed description and accompanying drawings.

DETAILED DESCRIPTION OF A PREFERRED EMBODIMENT

Figure 1:
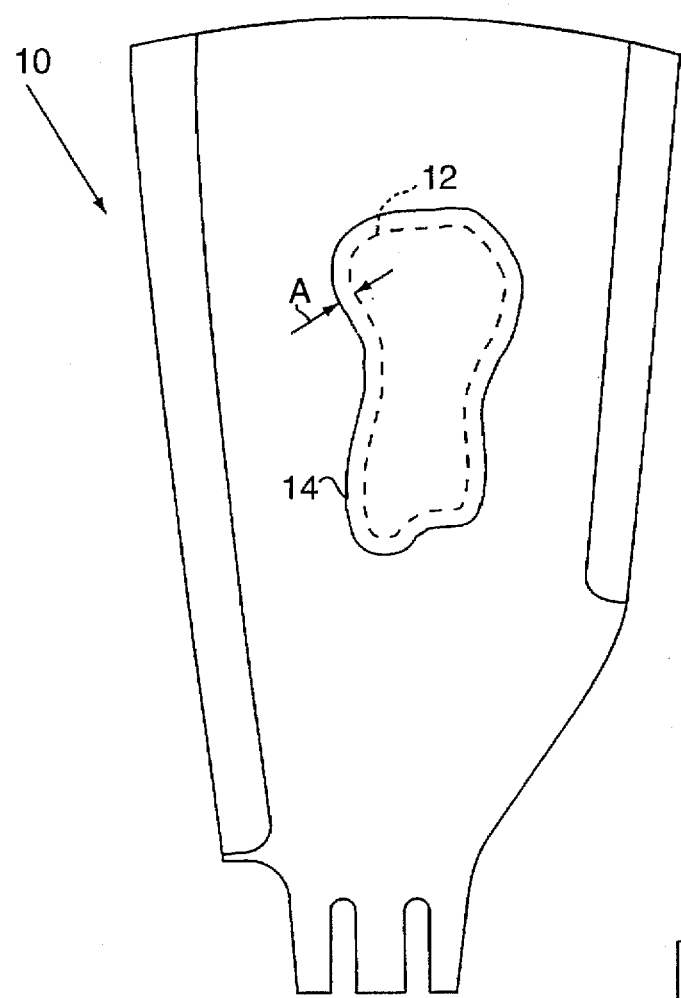
FIG. 1 is a top plan view of a typical article produced by resin transfer molding and exhibiting one or more dry spots rendering the article defective.

In FIG. 1, a typical article 10 produced by resin transfer molding is illustrated, and as shown in phantom includes at least one defect formed by a resin-depleted area or dry spot 12 extending into its surface. In this exemplary embodiment, the resin-impregnated article 10 is a fan blade, however, as will be recognized by those skilled in the pertinent art, the method and apparatus of the present invention can equally be applied to repair nearly any type of article produced by resin transfer molding.

In order to repair the blade 10 in accordance with the present invention, the flashing on the blade (not shown) is removed, and a thin plastic film 14 is cut and superimposed over the dry spot so that it completely covers and extends at least a border distance "A" beyond the perimeter of the spot. As can be seen, the width of the border A is less than that of the dry spot. An anti-adherent is then applied to all surfaces of the article so that upon removal of the plastic film 14, the entire article, except for the dry spot and its surrounding and contiguous border area A, is coated or otherwise covered with the anti-adherent. In the exemplary embodiment of the invention, a typical mold release agent, such as ZYVAX WATER SHIELD™ manufactured by Zyvax Inc. of Boca Raton, Fla. is used as the anti-adherent. The anti-adherent is first applied to a cloth and then wiped onto the surfaces of the article in one or more coats as necessary to provide a sufficient coating to substantially prevent the infiltration of resin into the coated, non-defective surface areas. Other methods of application may include spraying or applying each coat with a brush, and polishing/drying the coated surfaces with a clean dry cloth. The anti-adherent prevents resin from adhering to, and thus impregnating the coated surfaces, and in turn permits only the resin-depleted areas to be impregnated when repairing the article, as is described further below. As will be recognized by those skilled in the pertinent art, other suitable anti-adherents may be employed to prevent the resin from adhering to or otherwise impregnating the non-defective areas of the article, such as a suitable plastic film or like coating.

Figure 2:
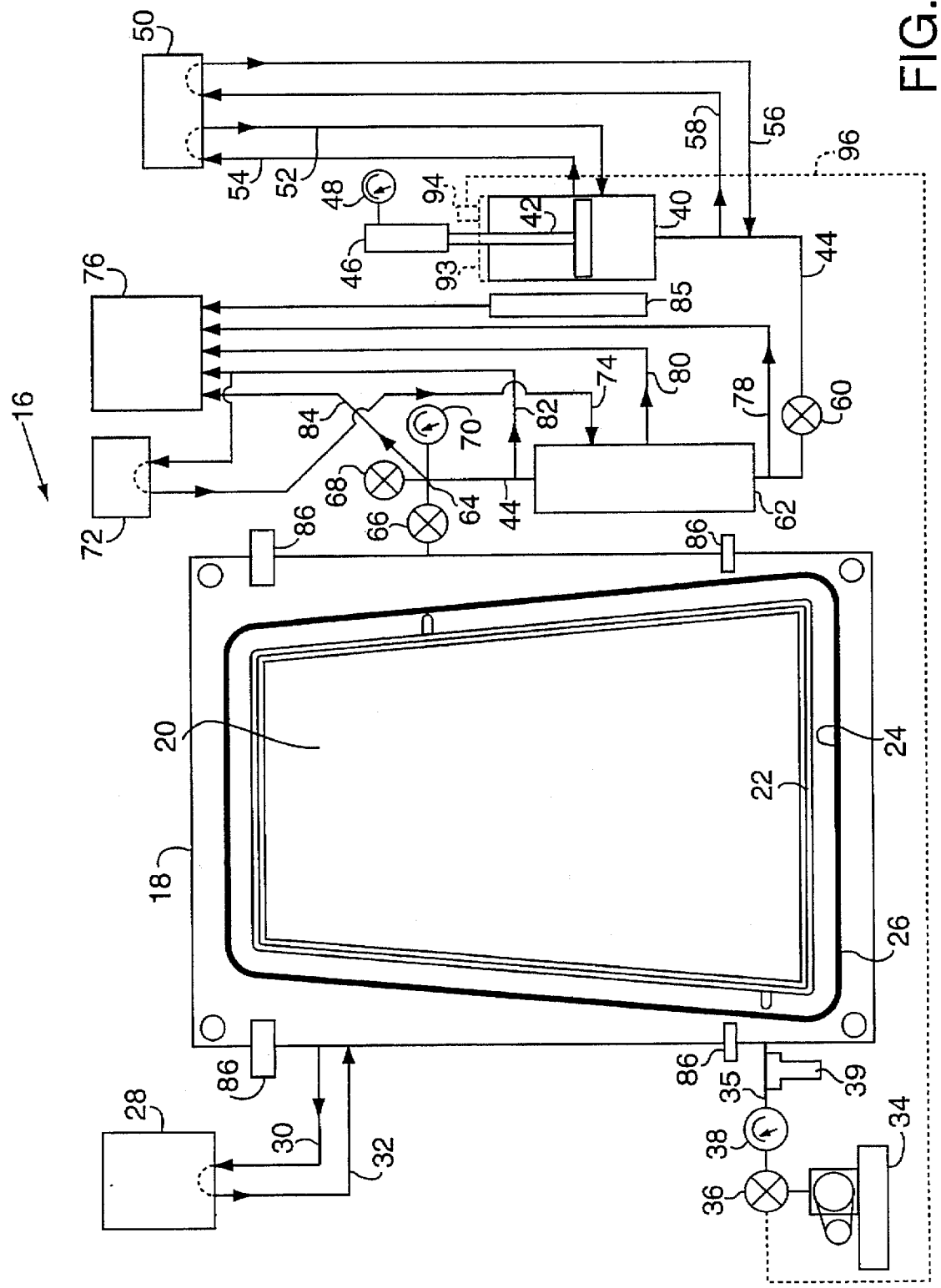
FIG. 2 is a schematic illustration of a system for repairing defective articles of the type illustrated in FIG. 1 according to the present invention.

Turning to FIG. 2, a system used for repairing a defective article in accordance with the present invention is indicated generally by the reference numeral 16. Most of the components of the system 16 are substantially the same as corresponding components disclosed in co-pending U.S. patent application Ser. No. 08/168,070, entitled "APPARATUS AND METHOD FOR RESIN TRANSFER MOLDING", filed on Dec. 14, 1993 and assigned to the same assignee as is the present invention, which is hereby expressly incorporated by reference as part of the present disclosure.

The system 16 comprises a two-piece mold 18 defining a mold cavity 20 corresponding in size and shape to the article 10 for receiving and repairing the article. A resin track 22 is formed within the mold and surrounds the mold cavity for introducing liquid resin into the cavity. A gasket groove 24 is also formed within the mold at the parting line between the mold halves, and is spaced outwardly from the resin track to receive a gasket 26 for surrounding and sealing the cavity. In this embodiment of the invention, the gasket 26 is an o-seal type gasket which is cut in a straight length with spliced ends. The gasket 26 is laid within the groove 24 so that the spliced ends overlap one another, and the ends are sealed with a chromate putty to create a continuous seal throughout the parting line of the mold.

A mold temperature controller 28 is coupled to the mold 18, and includes a thermocouple 30 for monitoring the temperature of the mold, and a heat input line 32 for heating the mold. A vacuum pump 34 is coupled to the mold cavity 20 through a resin outlet line 35 for evacuating the mold cavity prior to resin injection. The resin outlet line 35 includes a vacuum shut-off valve 36 for opening and closing the line, a vacuum gauge 38 for monitoring the vacuum pressure of the cavity, and an overflow container 39 for receiving excess resin from the mold.

A heated resin pot 40 defines a cylindrical bore receiving one end of a hydraulic piston 42 for discharging liquid resin from the pot into a heated resin line 44. A hydraulic cylinder 46 is coupled to the piston 42 to drive the piston within the pot, and a hydraulic pressure gauge 48 is coupled to the cylinder to monitor the hydraulic pressure and in turn control the pressure of the resin injected into the resin line 44. As will be recognized by those skilled in the pertinent art, other suitable means may be employed to inject the resin, such as a pneumatic system employing pressurized air to inject the resin, or a mechanical drive employing a screw, for example, to drive a piston to inject the resin.

An injection temperature controller 50 comprises a heat input line 52 coupled to the resin pot for heating the pot, and a thermocouple 54 for monitoring the temperature of the pot and maintaining the resin at a substantially predetermined working temperature. Another heat input line 56 is coupled between the temperature controller 50 and the resin line 44 for heating the resin line, and a thermocouple 58 is coupled between the resin line and the temperature controller for monitoring the temperature of the line and maintaining a substantially predetermined resin temperature.

A resin throttling valve 60 is coupled within the resin line 44 to control the resin flow rate, and a preheater 62 is coupled to the resin line downstream from the throttling valve for preheating the resin to a predetermined temperature prior to injection into the mold. A T-fitting 64 is coupled within the resin line 44 between the preheater 62 and the mold, and a first branch of the T-fitting is coupled to a resin inlet valve 66 for controlling the flow of resin into the mold. A second branch of the T-fitting is coupled to a bleed valve 68 for bleeding resin from the preheater, and a third branch of the T-fitting is coupled to a pressure gauge 70 for monitoring the resin pressure at the inlet to the mold. A preheater temperature controller 72 includes a heat input line 74 coupled to the preheater for heating the resin within the preheater.

A recording and display unit 76, such as a chart recorder and/or digital display, is coupled to several temperature sensors for recording and displaying the temperature of the resin at desired points within the apparatus. The temperature sensors include a first thermocouple 78 coupled to the inlet of the preheater 62, a second thermocouple 80 coupled to a mid-portion of the preheater, a third thermocouple 82 coupled to the outlet of the preheater, and a fourth thermocouple 84 coupled to the T-fitting 64. A position sensor 85 is mounted adjacent to the piston 42 and is also coupled to the recording and display unit 76 for monitoring the position and rate of movement of the piston, and thus the resin flow rate, and transmitting signals to the recording and display unit indicative thereof. Although other types of position sensors may be employed, an acceptable and preferred sensor is the Sony "Magnascale", model no. NA31-F. Also in the exemplary embodiment, the recording and display unit is a chart recorder which records and displays in addition to the resin temperature readings, the piston travel vs. time in graphical format throughout the resin transfer process. As will be recognized by those skilled in the pertinent art, other suitable means may be employed to measure the resin flow rate, such as a flow meter mounted within the resin line 44.

Figure 3:
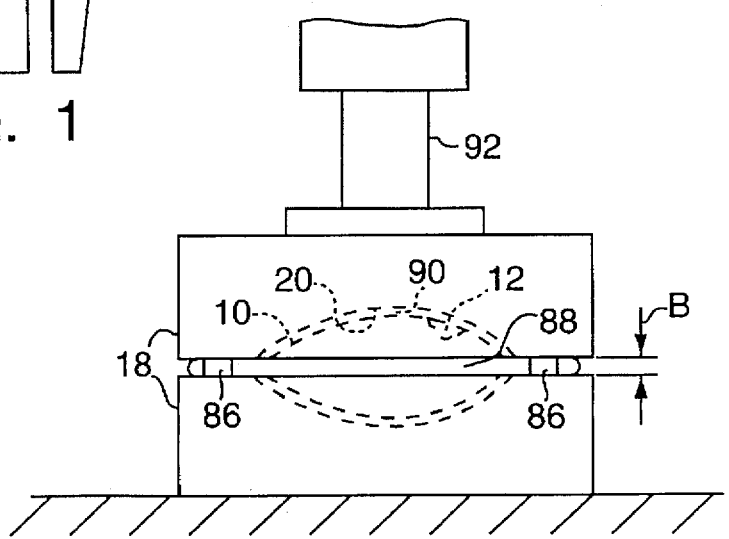
FIG. 3 is a partially schematic, side elevational view of the two-piece mold of the system of FIG. 2 configured for repairing defective articles in accordance with the present invention.

Prior to placing the defective article 10 into the mold cavity 20, mold release is applied to the surfaces of the cavity in the same manner as described above for application to the article. Then, once the article 10 is inserted into the mold cavity, the o-seal 26 is placed within the groove 24, and the spliced ends of the gasket are sealed with a chromate putty. A plurality of spacers or metal shims 86 are then placed within the parting line of the mold 18 on the outer side of the o-seal groove 24, and are substantially equally spaced in pairs on opposite sides of the mold relative to each other. Preferably, each shim projects outwardly beyond the adjacent edge of the mold as shown in FIG. 2 in order to facilitate removal of the shims, as is described further below. As shown typically in FIG. 3, each shim defines substantially the same thickness "B", so that when the top half of the mold is brought down into engagement with the shims a substantially uniform gap 88 is formed at the parting line of the mold. As shown in phantom in FIG. 3, the shims also create a gap 90 between the exterior surface(s) of the article 10 and the walls defining the mold cavity in order to permit the passage of resin through the gap and into each dry spot, as is described further below. In this embodiment of the invention, the shims define a thickness within the range of about 0.030–0.040 inch. Although this specific dimensional range for the shims has proven to provide particularly good repair results in the exemplary embodiment, it will be recognized by those skilled in the pertinent art that this range may be adjusted within limits due to variations in system parameters, such as the dimensions or geometry of a particular article being repaired, or of the mold or gasket, or depending upon the type of resin employed. Once the shims 86 are properly positioned and the top half of the mold 18 is brought downwardly into engagement with the shims as shown in FIG. 3, a hydraulic press 92 is used to apply a clamping pressure to the mold in order to maintain the mold halves in engagement with the shims and form a substantially air-tight seal along the entire parting line during resin injection, as is described further below.

The mold cavity 20 and preheater 62 are then evacuated to a negative pressure by operating the vacuum pump 34, opening the resin inlet valve 66 and vacuum shut-off valve 36, and closing the resin throttling valve 60. In situations where it is unnecessary to use a preheater, the preheater may be removed and/or only the mold cavity 20 may be evacuated. In the exemplary embodiment of the invention, the resin employed was AMD 045™, which is now sold by the 3M Company of Minneapolis, Minn. under the designation "PR 520". This resin and many other resins employed in resin transfer molding processes, such as "PR 500" also sold by 3M, are relatively viscous at room temperature, and are preheated in the resin pot 40 to an initial working temperature above room temperature, and are then heated within the resin line 44 to a secondary working temperature above the preheat temperature. Both the initial and secondary working temperatures are above room temperature, but are below the temperature for catalyzing the resin, i.e., the resin molding temperature, in order to maintain substantially constant resin properties throughout each molding process.

Once the vacuum pressure within the mold cavity 20 falls below a predetermined value as indicated by the vacuum gauge 38, thus indicating that an acceptable vacuum is achieved, the vacuum leakage rate is checked to ensure that it is below a maximum value. In the exemplary embodiment of the invention, the maximum leakage rate is approximately 0.5 inch of mercury per 5.0 minute period. If the leakage rate is above this maximum level, it may be necessary to replace and/or adjust the o-seal 26, and/or increase the clamping pressure of the mold clamp 92. If the leakage rate is below the maximum level, the mold temperature controller 28 and preheat temperature controller 72 are adjusted to increase the temperature of the mold 18, preheater 62 and T-fitting 64 to a preheat temperature, which is slightly below the resin injection temperature, and are each maintained at the preheat temperature for a minimum preheat period prior to resin injection. In the exemplary embodiment of the invention using AMD 045 resin, the preheat temperature was approximately 315° F., and the minimum preheat period was approximately 2 hours. Upon expiration of the preheat period, the preheater 62 and T-fitting 66 are heated to the resin injection temperature, which in the exemplary embodiment of the invention using AMD 045 resin was approximately 325°–330° F.

A sufficient quantity of resin is then loaded into the resin pot 40, and the temperature controller 50 is actuated to heat the resin pot to the initial working temperature. In the exemplary embodiment of the invention using AMD 045™ resin, the initial working temperature of the resin pot was approximately 140° F. The resin in the pot is then degassed to substantially remove entrained air or other gases in the resin. First, prior to installing the piston 42 in the resin pot, a degassing cover 93 is placed over the opening of the resin pot as shown in phantom in FIG. 2, and is sealed with a gasket, sealing putty, or like means for sealing the interface between the cover and resin pot. As also shown in phantom in FIG. 2, a vacuum fitting 94 is coupled on one end through the cover 93 to the interior of the resin pot, and is coupled on the other end through a vacuum line 96 and the vacuum valve 36 to the vacuum pump 34. The valve 36 is then opened and the vacuum pump 34 is operated for a sufficient period of time so as to substantially remove entrained gases from the resin. Preferably, the degassing cover 93 is made of a clear or transparent material, such as Plexiglas or like plastic, so that the resin can be visibly observed during the degassing period. As the entrained gases are drawn from the resin, bubbles are created on the resin surface, and thus when bubbles no longer appear, this is an indication that the resin is substantially degassed. If desired, a vacuum pressure gauge (not shown) may be connected to the vacuum fitting 94 to measure the vacuum pressure within the pot, and to terminate the degassing step when the vacuum pressure drops below a predetermined value. In the exemplary embodiment of the invention using AMD 045™ resin, the degassing period was approximately 2 hours. As will be recognized by those skilled in the pertinent art, the degassing period necessary to substantially degas the resin may vary depending upon the volume and type of resin employed and/or the configuration of the resin pot.

Once the resin is degassed, the degassing cover 92 is removed and the piston 42 is installed within the pot. The temperature controller 50 is actuated to heat the resin line 44 to the secondary working temperature, which in the exemplary embodiment of the invention using AMD 045™ resin was approximately 175° F. The hydraulic cylinder 46 is then actuated to drive the piston 42 downwardly, the resin inlet valve 66 is closed, and the resin throttling valve 60 is opened to inject resin into the preheater 62. When the preheater is filled with resin, the resin bleed valve 68 is operated to bleed resin from the preheater through the valve and into a cup (not shown). When there are no visible air bubbles in the resin discharged into the cup, the thermocouple 82 coupled to the preheater outlet is actuated to record the outlet resin temperature, and the resin inlet valve 66 is opened to permit the resin to flow into the mold cavity. The temperature controller 72 is responsive to the signals transmitted by the thermocouple 82 to control the preheater temperature, and in turn substantially maintain a predetermined resin temperature throughout the resin transfer process.

The pressure applied by the hydraulic cylinder 46 to the piston 42 is then increased to an initial injection pressure as indicated by the hydraulic pressure gauge 48. In the exemplary embodiment of the invention using AMD 045™ resin, the initial injection pressure was approximately 100 psi. The resin flow rate into the preheater is then modulated by adjusting the resin throttling valve 60 to maintain the temperature of the resin discharged from the preheater within a predetermined molding temperature range as indicated by the thermocouple 82. In the exemplary embodiment of the invention using AMD 045™ resin, the molding temperature range was approximately 305°–320° F. As the resin is injected into the mold cavity, the resin flows into the gap 90 between the surfaces of the article 10 coated with anti-adherent and the walls of the mold cavity, and in turn flows into and impregnates each dry spot 12. The resin outlet line 35 includes a sight glass (not shown) for visually monitoring the outlet line, and once resin appears in the outlet sight glass, the vacuum shut-off valve 36 is closed.

While the resin is injected into the mold cavity 20, the resin flow rate is monitored, and the resin pressure is periodically increased in response to the resin flow rate falling below a first minimum value. In the preferred embodiment of the invention this is achieved by monitoring the piston displacement with the position sensor 85 and recording the same at predetermined time intervals with the recording and display unit 76, thus indicating the rate of piston travel and resin flow rate. In the exemplary embodiment of the invention, the piston travel was recorded approximately once per minute. When the rate of piston travel (which is indicative of resin flow rate) falls below a first minimum value, the hydraulic pressure applied by the hydraulic cylinder 46 to the piston 42 is increased by a predetermined pressure increment as indicated by the hydraulic pressure gauge 48, thus incrementally increasing the resin pressure. In the exemplary embodiment of the invention, when the rate of piston travel dropped below approximately 0.1 inch per minute (the first minimum value), the hydraulic pressure applied to the piston was increased by approximately 50 psi (the predetermined pressure increment). The step of monitoring the rate of piston travel and thus the resin flow rate, and periodically increasing the resin pressure is carried out until the rate of piston travel (or resin flow rate) falls below a second minimum value less than the first minimum value, and the resin pressure as indicated by the pressure gauge 70 exceeds a maximum resin pressure value. In the exemplary embodiment of the invention using AMD 045™ resin, the second minimum value for the piston rate was approximately 0.005 inch per minute, and the maximum resin pressure was within the range of approximately 100–110 psi (at which time the hydraulic pressure was approximately 400 psi). In the exemplary embodiment using AMD 045™ resin, the entire step of monitoring and periodically increasing the pressure took approximately 20–30 minutes.

The maximum resin pressure is typically selected based upon the maximum pressure rating of the weakest component in the system. For example, if the maximum pressure rating of the hose used for the resin line is 150 psi, the maximum resin pressure should be set sufficiently below this value to provide an adequate margin of safety (e.g., 120 psi). Also, when the structural preform of the article 10 is made with relatively compressible materials, such as polyurethane or like closed cell foams, the maximum resin pressure typically cannot exceed approximately 60 psi without risking damage to the foam structure. The second minimum value for the piston rate, on the other hand, is preferably selected so that the rate of piston travel is substantially negligible at the maximum resin pressure. Because the resin typically has a limited pot life, the width of each gap 88 and 90, along with the maximum resin pressure and the resin flow rates are preferably selected to perform the injection process as quickly as possibly in order to complete resin injection before expiration of the pot life.

Once the minimum piston travel and maximum resin pressure values are achieved, each dry spot 12 of the article should be impregnated with resin. At this point, the clamping pressure applied by the press 92 is relaxed, the shims 86 are removed from the parting line of the mold, and the clamping pressure is then reapplied until the mold halves are brought into engagement, thus substantially closing the gap 88 in the parting line and the gap 90 between the article 10 and the surfaces of the mold cavity. Any excess resin squeezed from the gap 90 is permitted to bleed into the resin outlet line 35 and overflow container 39. The mold temperature controller 28 is then adjusted to increase the temperature of the mold to a curing temperature and the article is heat treated within the mold for a predetermined time period to cure the impregnated resin. In the exemplary embodiment of the invention using AMD 045™ resin, the curing temperature was approximately 355° F. and the curing time period was approximately 2 hours. After curing, the mold is permitted to cool down to room temperature, the article 10 is removed from the mold and any flashing is removed in the same manner as described above prior to resin injection.

One advantage of the present invention is that it is not necessary to scarf or otherwise remove dry spots, nor is it necessary to employ patch plies or like members. Rather, because the original fiber preform (or reinforcement) remains intact, and the resin may be injected into the mold cavity in the same manner as employed to initially produce the article, the structural integrity of the article is enhanced in comparison to prior art methods of repair, especially in the locations of former dry spots. The enhanced structural integrity achieved in accordance with the present invention is particularly evident when employing relatively high temperature resins, such as the PR 500 and PR 520 resins mentioned above. Yet another advantage of the present invention is that because the steps of scarfing or otherwise cutting away the resin starved areas, and applying patch plies or other patch members are avoided, the repair method of the present invention requires significantly less human interaction and skill in comparison to prior art methods, and therefore will typically be less expensive and more prone to producing repaired articles of high quality on a consistent basis. Moreover, the same mold and other components used to originally produce a resin-impregnated article may be used to repair a defective article in accordance with the present invention.

Another advantage of the present invention is that because the resin is preferably degassed prior to injection, air or other gases entrained in the resin are removed, thus preventing such entrained gases from otherwise causing further dry spots. This aspect of the present invention is particularly advantageous when used to produce original articles by resin transfer molding, and is not just applicable to the above-described method and system of repair. Indeed, as will be recognized by those skilled in the pertinent art, the above-described system and procedural steps may equally be employed to produce original resin-impregnated articles, as opposed to only repairing such articles. In this case, rather than inserting a defective part coated with a mold release agent into the mold cavity, a structural preform typically made of fibers woven or braided into sheet form and/or a closed-cell foam is inserted into the mold cavity, and the resin is degassed and then transferred into the mold cavity and gap as described above.

As will also be recognized by those skilled in the pertinent art, numerous changes may be made to the above-described and other embodiments without departing from the scope of the invention as defined in the appended claims. For example, it may be desirable to connect several of the components of the apparatus, such as the position sensor, temperature controllers, resin flow valves, and the pressure gauges or like pressure sensors to a computer control unit for automatically controlling the apparatus in accordance with the present invention. It is also noted that the particular temperatures, times, and pressures set forth above are generally for the exemplary embodiment only, and it may be necessary or desirable to change one or more of these parameters based upon usage of different resins, preform materials, article shapes and dimensions, etc. It may also be desirable to use the method and apparatus of the invention to repair resin-depleted areas located internally within an article by, for example, drilling a hole through a surface of the article to permit the resin to flow into the depleted area and/or to repair surface imperfections in damaged or worn articles. Accordingly, the detailed description of a preferred embodiment set forth above is to be taken in an illustrative as opposed to a limiting sense.

What is claimed is:

1. A system for repairing a defective article produced by resin transfer molding having at least one resin-depleted area, comprising:

a mold defining a mold cavity having a shape corresponding to a shape of the defective article for receiving the defective article;

means for defining a gap between an exterior surface of the defective article received within the mold cavity and a wall defining the mold cavity;

means for substantially preventing resin from infiltrating the exterior surface of the article excluding the at least one resin-depleted area; and means for injecting resin into the gap and impregnating the at least one resin-depleted area with the injected resin.

2. A system as defined in claim 1, wherein the mold includes first and second mold sections defining the mold cavity and forming a parting line between the two mold sections, and the means for defining a gap includes at least one spacing member interposed at the parting line between the two mold sections creating a gap within the parting line and the gap between the defective article and the wall defining the mold cavity.

3. A system as defined in claim 2, further comprising at least one gasket member interposed between the two mold sections and extending along the parting line for substantially sealing the mold cavity at the parting line.

4. A system as defined in claim 1, further comprising means for closing the gap after injecting the resin into the gap and substantially impregnating the at least one resin-depleted area.

5. A system as defined in claim 1, further comprising means for monitoring resin flow rate, and means for increasing resin pressure in response to the resin flow rate falling below a first minimum flow rate.

6. A system as defined in claim 5, further comprising a resin container and a piston received within the resin container for discharging resin from the container into the gap, and wherein the means for monitoring includes a position sensor generating signals indicative of a rate of piston travel and the resin flow rate.

7. A system as defined in claim 1, wherein the means for preventing resin from infiltrating includes an anti-adherent coating applied to the exterior surface of the article excluding the at least one resin-depleted area.

8. A system as defined in claim 7, wherein the anti-adherent coating is comprised of a mold release agent.

9. A system as defined in claim 1, further comprising means for substantially degassing the resin prior to injection.

10. A system as defined in claim 9, wherein the means for injecting includes a chamber containing resin, and the means for degassing includes a vacuum pump coupled to the resin chamber for pumping gases from the chamber.

* * * * *